US011925281B2

(12) United States Patent
Shaaban et al.

(10) Patent No.: US 11,925,281 B2
(45) Date of Patent: Mar. 12, 2024

(54) SYSTEMS AND METHODS FOR GENERATING CLOTHING RECOMMENDATIONS USING EXPERT MODELS

(71) Applicant: ACI HOLDINGS LTD., Hoffman Estates, IL (US)

(72) Inventors: Ahmed Farouk Shaaban, South Barrington, IL (US); Venkat Thandra, South Barrington, IL (US); Dino Eliopulos, South Barrington, IL (US); Benjamin Girard, Evanston, IL (US); Cole Seabrook, Wauwatosa, IL (US); Aria Kim, Chicago, IL (US); Manu Varma, Bronx, NY (US); Yijun Wang, Chicago, IL (US)

(73) Assignee: ACI HOLDINGS LTD., Hoffman Estates, IL (US)

( * ) Notice: Subject to any disclaimer, the term of this patent is extended or adjusted under 35 U.S.C. 154(b) by 0 days.

(21) Appl. No.: 18/098,590

(22) Filed: Jan. 18, 2023

(65) Prior Publication Data
US 2023/0148767 A1 May 18, 2023

Related U.S. Application Data

(63) Continuation of application No. 17/060,446, filed on Oct. 1, 2020, now Pat. No. 11,602,232.

(60) Provisional application No. 62/909,279, filed on Oct. 2, 2019.

(51) Int. Cl.
*A47G 1/02* (2006.01)
*G06F 16/9535* (2019.01)
*G06N 5/04* (2023.01)

(52) U.S. Cl.
CPC ........... *A47G 1/02* (2013.01); *G06F 16/9535* (2019.01); *G06N 5/04* (2013.01)

(58) Field of Classification Search
CPC ......... A47G 1/02; G06F 16/9535; G06N 5/04
See application file for complete search history.

(56) References Cited

U.S. PATENT DOCUMENTS

2018/0032227 A1  2/2018  Broxson
2019/0250781 A1*  8/2019  Savitski ............ H04M 1/72436

* cited by examiner

Primary Examiner — Kenneth B Lee, Jr.
(74) Attorney, Agent, or Firm — GLOBAL IP COUNSELORS, LLP

(57) ABSTRACT

Systems and methods for generating clothing recommendations are disclosed herein. In an embodiment, a system for generating a clothing recommendation includes a mirror, a display device, a memory and a processor. The mirror has a first side including a reflective surface. The display device displays a clothing recommendation to the user. The memory stores a wardrobe database including clothing data related to a plurality of items of clothing owned by the user. The processor is programmed to: (i) access a database including a plurality of expert models; (ii) select of one of the plurality of expert models based on a preference of the user; (iii) generate the clothing recommendation using the clothing database in combination with the selected expert model; and (iv) cause the display device to display the clothing recommendation to the user while the user views the first side of the mirror.

20 Claims, 9 Drawing Sheets

SYSTEMS AND METHODS FOR GENERATING CLOTHING RECOMMENDATIONS USING EXPERT MODELS

PRIORITY

This patent application claims priority to U.S. Application Ser. No. 17/060,446, filed Oct. 1, 2020, entitled "System and Method for Generating Clothing Recommendations Via a Smart Mirror," which claims priority to U.S. Provisional Patent Application No. 62/909,279, filed Oct. 2, 2019, entitled "System and Method for Recommendations Via a Smart Mirror," the entire contents of each of which are incorporated herein by reference and relied upon.

BACKGROUND

Technical Field

This disclosure generally relates to systems and methods that utilize a modified mirror to generate clothing recommendations. More specifically, the present disclosure relates systems and methods that generate clothing recommendations based on various data related to a user's schedule, upcoming weather predictions, past outfit choices, fashion trends, expert advice, and other criteria.

Background Information

Every day, individuals are confronted with the decision of what to wear. While certain people have the knowledge to make confident fashion choices, others find it difficult to weigh the myriad considerations that go into the decision. Many people spend inordinate amounts of time trying on outfits and reviewing how they look in a mirror, often with little sense that an optimal choice will ultimately made.

Some individuals seek out and incorporate the advice of fashion experts, stylists, influencers and the like to assist in clothing choices. Indeed, a major premise of the fashion industry is the ability of experts to stay on top of trends and convey that information to the benefit of ordinary consumers. Unless an individual is willing to invest the time and resources to seek out such information, however, they are generally left to their own devices when deciding how to dress every day.

SUMMARY

It has been found that many people value fashion advice. Some people suffer from physical issues, such as color blindness or reduced vision, that prevent optimal clothing choices. Other people simply have poor taste. The present disclosure accordingly provides systems and methods for generating clothing recommendations for a user. In particular, the present disclosure provides systems and methods which enable the user to receive personalized clothing recommendations which reflect the style of a particular fashion expert, stylist; influencer or other individual.

A first aspect of the present disclosure is to provide a system for generating one or more clothing recommendation for a user. The system includes a mirror, a display device, a memory, and a processor. The mirror includes a first side and a second side, the first side including a reflective surface. The display device is configured to display one or more image to the user while the user views the first side of the mirror. The memory is configured to store a wardrobe database including clothing data related to a plurality of items of clothing owned by the user. The processor is programmed to: (i) access the clothing data in the wardrobe database; (ii) generate a clothing recommendation based on the clothing data, the clothing recommendation including at least one suggested item of clothing of the plurality of items of clothing; and (iii) cause the display device to display the clothing recommendation to the user while the user views the first side of the mirror.

In accordance with a second aspect of the present disclosure, which can be combined with the first aspect, at least one of the processor and the memory is located remotely from the display device.

In accordance with a third aspect of the present disclosure, which can be combined with any one or more of the previous aspects, the processor generates the clothing recommendation based on an expert model developed using preferences of a third party expert.

In accordance with a fourth aspect of the present disclosure, which can be combined with any one or more of the previous aspects, the processor is programmed to enable the user to select the expert model from a plurality of expert models developed, respectively, using preferences of a plurality of third party experts.

In accordance with a fifth aspect of the present disclosure, which can be combined with any one or more of the previous aspects, the processor is programmed to use the clothing data to calculate a total score for multiple of the plurality of items of clothing, and to generate the clothing recommendation based on the calculated total scores.

In accordance with a sixth aspect of the present disclosure, which can be combined with any one or more of the previous aspects, the processor is programmed to generate the clothing recommendation based at least in part on one or more of a current weather forecast or information from the user's calendar.

In accordance with a seventh aspect of the present disclosure, which can be combined with any one or more of the previous aspects, the display device is mounted on the second side of the mirror, and the mirror is configured to be made at least partially transparent so that display of the clothing recommendation is viewable through the first side while the user views the first side.

In accordance with an eighth aspect of the present disclosure, which can be combined with any one or more of the previous aspects, a system for generating one or more clothing recommendation for a user includes a mirror, an image capturing device, a memory, and a processor. The mirror includes a first side and a second side, the first side including a reflective surface. The image capturing device is configured to record one or more image of the user while the user views the first side of the mirror. The memory is configured to store a wardrobe database including clothing data related to the one or more image recorded by the image capturing device. The processor is programmed to: (i) access the clothing data in the wardrobe database; (ii) generate a clothing recommendation based on the clothing data, the clothing recommendation including a suggested item of clothing from the one or more image recorded by the image capturing device; and (iii) cause presentation of the clothing recommendation to the user.

In accordance with a ninth aspect of the present disclosure, which can be combined with any one or more of the previous aspects, at least one of the processor and the memory is located remotely from the display device.

In accordance with a tenth aspect of the present disclosure, which can be combined with any one or more of the previous aspects, the processor generates the clothing recommendation based on an expert model developed using preferences of a third party expert.

In accordance with an eleventh aspect of the present disclosure, which can be combined with any one or more of the previous aspects, the processor is programmed to enable the user to select the expert model from a plurality of expert models developed, respectively, using preferences of a plurality of third party experts.

In accordance with a twelfth aspect of the present disclosure, which can be combined with any one or more of the previous aspects, the processor is configured to extract at least some of the clothing data from the one or more image recorded by the camera.

In accordance with a thirteenth aspect of the present disclosure, which can be combined with any one or more of the previous aspects, the processor is configured to cause presentation of the clothing recommendation by causing a display of at least one image related to the suggested clothing which has been recorded by the image capturing device.

In accordance with a fourteenth aspect of the present disclosure, which can be combined with any one or more of the previous aspects, the processor is programmed to generate the clothing recommendation based at least in part on one or more of a current weather forecast or information from the user's calendar.

In accordance with a fifteenth aspect of the present disclosure, which can be combined with any one or more of the previous aspects, a method for generating one or more clothing recommendation for a user includes creating a wardrobe database for the user, the wardrobe database including clothing data related to a plurality of items of clothing owned by the user, accessing situational data related to a condition or activity to be experienced by the user, generating a clothing recommendation based on the clothing data and the situational data, the clothing recommendation including a suggested item of clothing of the plurality of items of clothing stored by the wardrobe database, and causing presentation of the clothing recommendation to the user.

In accordance with a sixteenth aspect of the present disclosure, which can be combined with any one or more of the previous aspects, the method includes generates the clothing recommendation based on an expert model developed using preferences of a third party expert.

In accordance with a seventeenth aspect of the present disclosure, which can be combined with any one or more of the previous aspects, the method includes enabling the user to select the expert model from a plurality of expert models developed, respectively, using preferences of a plurality of third party experts.

In accordance with an eighteenth aspect of the present disclosure, which can be combined with any one or more of the previous aspects, the situational data includes data related to at least one of a current or future weather condition or the user's daily schedule.

In accordance with a nineteenth aspect of the present disclosure, which can be combined with any one or more of the previous aspects, the method includes calculating a total score for multiple of the plurality of items of clothing based on the clothing data and the situational data, and generating the clothing recommendation based on the calculated total scores.

In accordance with a twentieth aspect of the present disclosure, which can be combined with any one or more of the previous aspects, the method includes weighting one of the clothing data and the situational data more heavily than the other of the clothing data and the situational data when calculating the total scores.

Other objects, features, aspects and advantages of the systems and methods disclosed herein will become apparent to those skilled in the art from the following detailed description, which, taken in conjunction with the annexed drawings, discloses exemplary embodiments of the disclosed systems and methods.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
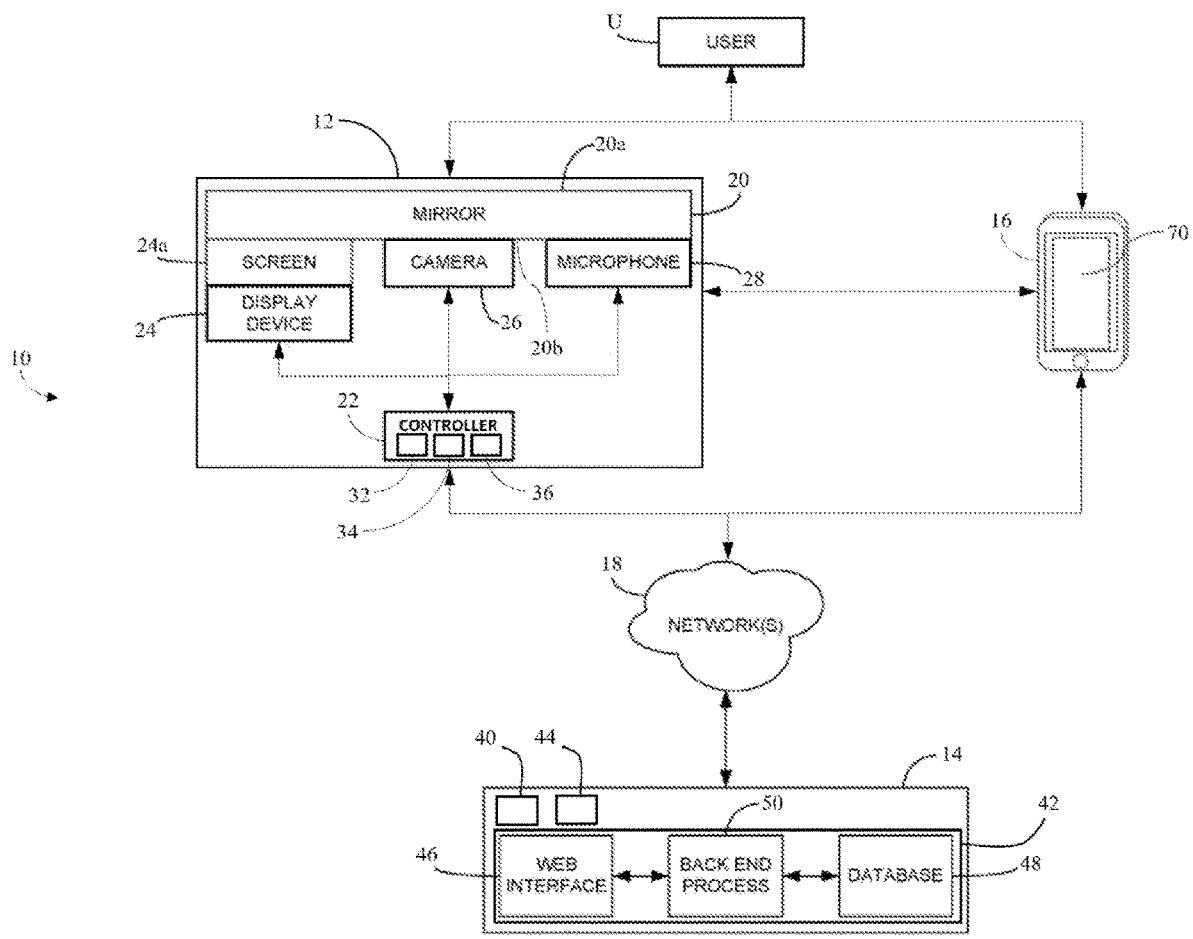
FIG. 1 is a block diagram of an example embodiment of a system for generating one or more clothing recommendation in accordance with the present disclosure.

FIG. 1 illustrates an example embodiment of a system 10 for generating clothing recommendations. The system 10 includes a mirror unit 12. Optionally, the system 10 can further include a central server 14 and/or a user terminal 16 which are configured to communicate with the mirror unit 12 via one or more intervening network 18. In an embodiment, the mirror unit 12 can utilize the central server 14 and/or the user terminal 16 to provide a user U with clothing recommendations based on various data related to the user's U schedule, upcoming weather predictions, past outfit choices, fashion trends, expert advice, and/or other criteria. As used herein, "clothing" can refer to one or more item to be worn by the user U on any given day. An "item of clothing" can include any garment and/or accessory that can be worn by the user U, for example, shirts, blouses, pants, dresses, skirts, belts, shoes, hats, jewelry, and/or other garments or accessories. Additionally or alternatively, the system 10 can provide recommendations regarding makeup and/or hair products.

Figure 2A:
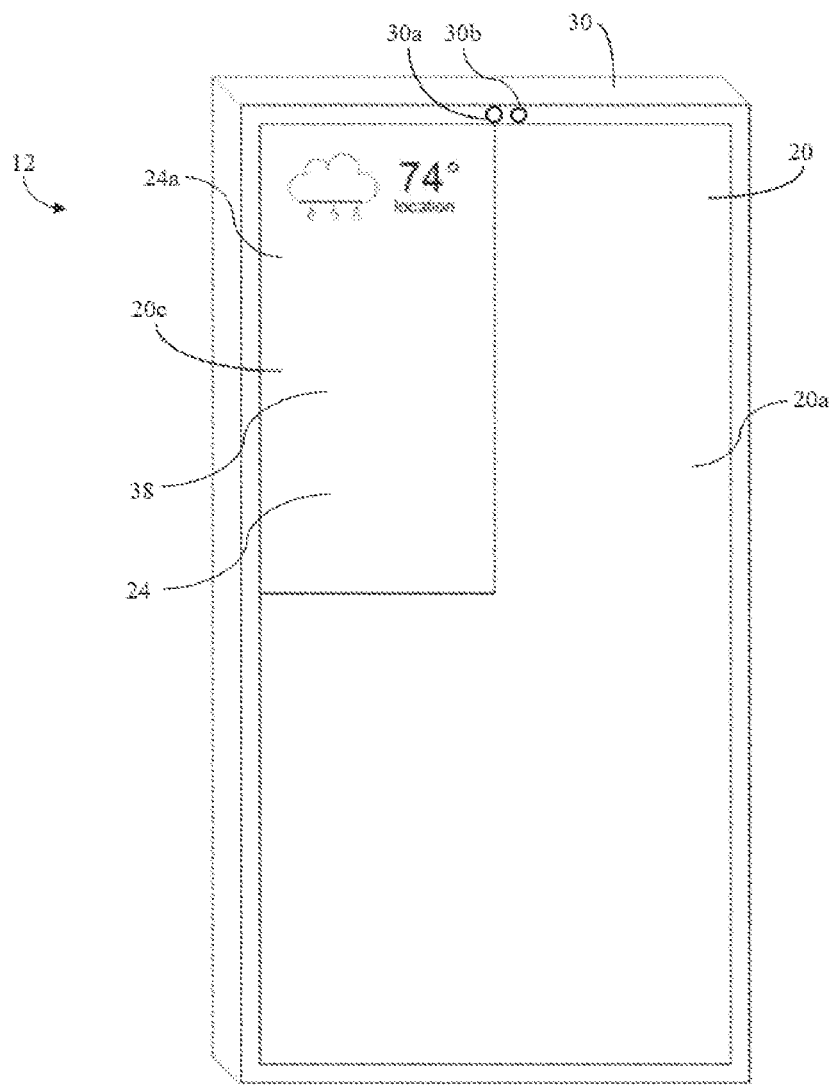
FIG. 2A is a front perspective view of an example embodiment of a mirror unit utilized by the system of FIG. 1.
Figure 2B:
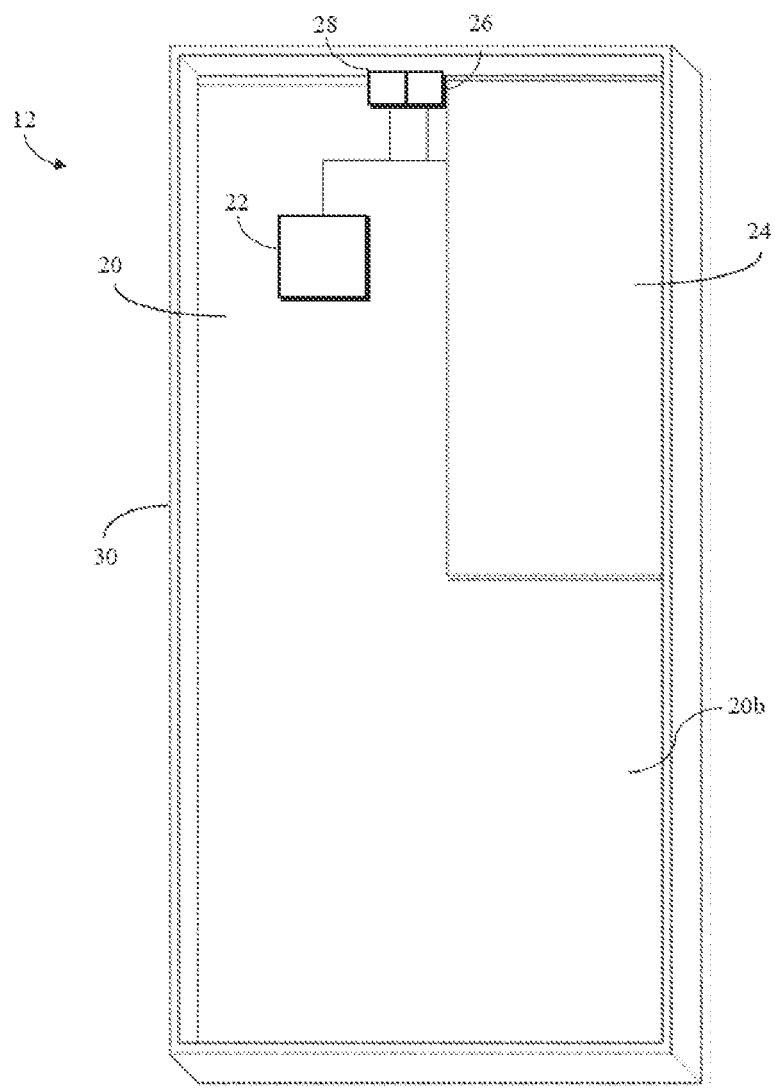
FIG. 2B is a rear perspective view of the mirror unit of FIG. 2A.

FIGS. 2A and 2B illustrate the mirror unit 12 in more detail. As illustrated, the mirror unit 12 can include a mirror 20 having a front side 20a and a back side 20b. The front side 20a of the mirror 20 can include a reflective surface, such that a user U can view himself or herself in the front side 20a of the mirror 20, for example, to try on and review an outfit after a clothing recommendation has been made by the system 10 in accordance with the methods discussed below.

In an embodiment, the mirror 20 can be made at least partially transparent, e.g., can include a transparent portion or alternate between transparent and nontransparent states. For example, the mirror 20 can be a two-way or partial mirror that reflects light impinging on the front side 20a while permitting the transmission of light arriving at the back side 20h. In an embodiment, the mirror 20 can include a transparent acrylic sheet. The mirror 20 can further include a film applied thereto (e.g., applied to the acrylic sheet) which creates the two-way mirror effect, such that (i) when the back side 20h is unlit (e.g., by virtue of a cover to prevent the entrance of light to the back side 20b), the first side 20a acts as a typical mirror reflecting incident light, and (ii) when the back side 20b is lit (e.g., by removing the cover and/or displaying an image by a display device 24, as discussed below), the light can pass through to and be visible to the user U while the user U views the front side 20a.

The mirror unit 12 can include one or more of a controller 22, a display device 24, an image capturing device 26, and a microphone 28, In the illustrated embodiment, the display device 24, the image capturing device 26, and the microphone 28 are wired to the controller 24 on the back side 20b of the mirror 20, such that the controller 22 can be programmed to control each of the display device 24, the image capturing device 26, and the microphone 28 in accordance with the methods discussed herein. Alternatively, the controller 22 can be located remotely and wirelessly communicate with each of the display device 24, the image capturing device 26, and the microphone 28, for example, via the network 18. For example, the controller 22 can be located at the central server 14 or the user terminal 16. In various embodiments discussed in more detail below, the controller 22 can receive data from one or more of the display device 24, the image capturing device 26, and the microphone 28, which data can then be used to generate a clothing recommendation for the user U on any given day.

The mirror unit 12 can include a frame 30 for mounting the mirror 20. As illustrated by FIG. 2B, the frame 30 can have sufficient depth to create enough space on the back side 20b of the mirror 20 for further mounting of one or more of the controller 22, the display device 24, the image capturing device 26, and the microphone 28. As illustrated by FIG. 2A, the frame 30 can include a first aperture 30a enabling a lens of the image capturing device 26 to face the user U as the user U looks into the mirror 20. The frame 30 can also include a second aperture 30b enabling a receiver of the microphone 28 to face the user U as the user U looks into the mirror 20.

The controller 22 can include one or more of a unit processor 32, a unit memory 34, and a data transmission device 36. The unit processor 32 is configured to execute instructions programmed into and/or stored by the unit memory 34, The instructions can be received from and/or periodically updated by the central server 14 in accordance with the methods discussed below. As described in more detail below, many of the steps of the methods described herein can be stored as instructions on the unit memory 34 and executed by the unit processor 32. The unit memory 34 can include, for example, a non-transitory storage medium. The data transmission device 36 can enable the controller 22 to communicate with the central server 14 and/or the user terminal 16 via the network 18.

The display device 24 can include a display screen 24a which faces the user U while looking into the front side 20a of the mirror 20. The display screen 24a can include, for example, a light-emitting diode (LED) screen which is mounted on the back side 20b of the mirror 20. The display device 24 is configured to project one or more image (e.g., still images, videos, etc.) through the mirror 20 using the display screen 24a (e.g., as shown in FIG. 2A). In the illustrated embodiment, the display screen 24a is located at a display portion 20c of the mirror 20, such that the display screen 24a projects one or more image through the mirror 20 so that the one or more image is displayed on the front side 20a of the mirror 20 within the display portion 20c. Here, the display portion 20c is a portion of the entire surface area of the front side 20a of the mirror 20 (e.g., the upper corner). In an embodiment, only the display portion 20c of the front side 20a needs to be made optionally transparent to light to enable the display of one or more image by the display screen 24a, while the rest of the front side 20a can be reflective at all times.

Although FIG. 2A illustrates the outline of the display screen 24a within the display portion 20c, in practice the display screen 24a (or any other components mounted in the frame 30 besides the mirror 20) would not always be visible from the front side 20a of the mirror 20. In an embodiment, the mirror unit 12 can alternate between a full mirror configuration and a display configuration. In the full mirror configuration, the display device 24 is turned off or in a mode such that the display screen 24a is not visible through the mirror 20 from the front side 20a. In the display configuration, the display device 24 is turned on or in a mode such that the display screen 24a is visible through the mirror 20 from the front side 20a. Alternatively, the display device 24 can be mounted on the front side 20a of the mirror 20.

In an embodiment, the display screen 24a can display a graphical user interface 38 ("GUI 38") which enables the user U to interact with the mirror unit 12. In this embodiment, the GUI 38 can include the display screen 24a and an input device. The input device can be or include, for example, a touch screen which allows the user U to touch the mirror 20 at the display portion 20c to input commands. The input device can also be or include the microphone 28, which accepts spoken commands from the user U as described in more detail below. In yet another embodiment, the user U can utilize the user terminal 16 as the input device. The user U can use the input device to input data to the GUI 38 regarding outfits and/or individual items of clothing which can then be used to generate clothing recommendations in accordance with the methods discussed herein.

The image capturing device 26 can include a camera configured to record one or more image (e.g., still images, videos, etc.) of a user U, for example, via a lens positioned at the first aperture 30a of the frame 30. Alternatively, the image capturing device 26 can be located elsewhere on the mirror unit 12, or can be located at a user terminal 16 in communication with the mirror unit 12. The image capturing device 26 can also be configured to convert images into digital files which can thereafter be processed in accordance with the methods discussed herein. The image capturing device 26 can further be configured for the sharing of images and/or tracking the user's U collection of clothing.

In an embodiment, the image capturing device 26 is configured to record a still image or video of a user U and communicate the still image or video to the display device 24 (e.g., via the controller 22), so that the still image or video can be displayed by the display screen 24a in real time. In this way, the mirror unit 12 can superimpose one or more suggested item of clothing over the user U so that the user U can see how the suggested item of clothing will look on his or her body without taking the time to try it on. By presenting the image/video in this way, the mirror unit 12 allows the user U to compare the superimposed item of clothing on the display screen 24a with whatever he or she is currently wearing which is reflected by the front side 20a of the mirror 20, such that the user U does not need to constantly change outfits to compare clothing options on any given day.

The microphone 28 is configured to receive voice commands that can be used to control operation of the mirror unit 12 and/or generate data regarding an outfit and/or individual item of clothing. The microphone 28 and/or the controller 22 can further be configured with voice recognition software, such that the user's U audible commands received by the microphone 28 can trigger an action, for example, by the controller 22 and/or the display device 24. For example, the voice recognition software could recognize a command such as "Recommend outfit" and thereafter cause the controller 22 to initiate the generation of one or more clothing recommendation in accordance with the methods discussed herein.

Referring again to FIG. 1, the mirror unit 12 can be placed in communication with the central server 14 and/or one or more user terminal 16 via one or more network 18. For example, the mirror unit 12 can communicate with the central server 14 and/or one or more user terminal 16 via various communication protocols, for example, via an Internet Protocol Suite or TCP/IP supporting HTTP. The network 18 can include a public network (e.g., the Internet, World Wide Web, etc.), a private network (e.g., local area network (LAN), etc.), and/or combinations thereof (e.g., a virtual private network, LAIN connected to the Internet, etc.). The network 18 can include a wired network, a wireless network, and/or a combination of the two.

The central server 14 can include one or more server computers, database servers and/or other types of computing devices, particularly in connection with, for example, the implementation of websites and/or enterprise software. The central server 14 can further include a central processor 40, a central memory 42, and a data transmission device 44. The central processor 40 is configured to execute instructions programmed into and/or stored by the central memory 42. As described in more detail below, many of the steps of the methods described herein can be stored as instructions on the central memory 42 and executed by the central processor 40. The central memory 42 can include, for example, a non-transitory storage medium. The data transmission device 44 can enable the central server 14 to communicate with the mirror unit 12 and/or the user terminal 16 via the network 18. In an embodiment, the controller 22 can be located at the central server 14, such that the central processor 40 operates as the unit processor 32, the central memory 42 operates as the unit memory 34, and the data transmission device 44 operates as the data transmission device 36.

It should be understood that the system 10 described herein does not require a central server 14. All of the functions of the central server 14 can be performed at the mirror unit 12, such that the mirror unit 12 is self-contained. Thus, any function or element described herein as being performed by or included at the central server 14 can also be performed by or included at the mirror unit 12. For example, the central processor 40 can be incorporated into the unit processor 32, the central memory 42 can be incorporated into the unit memory 34, and the data transmission device 44 can be incorporated into the data transmission device 36.

In the illustrated embodiment, the central memory 42 can include a web interface 46, a database 48, and back end processing instructions 50. Here, the web interface 46 and the database 48 can be controlled or accessed by the central processor 40 implementing appropriate software programs by executing the back end processing instructions 50 or other instructions programmed into and/or stored by the central memory 42. In an example embodiment, the web interface 46 and the back end processing instructions 50 can be implemented using the Django web framework, and the database 48 can be implemented using the PostgreSQL relational database management system (RDBMS). The web interface 46 can provide the GUI 38 that can be displayed on the display screen 24a of the mirror unit 12 to present clothing recommendations to the user U.

In addition to user credentials and similar data necessary to implement a web-based service, the database 48 can store clothing data relevant to a user U and/or situational data relevant to the user's U day. The database 48 can further store makeup anal/or hairstyle data regarding makeup and/or hair products/styles which go well with certain clothing or are appropriate based on the expert that the user U is trying to emulate, the weather conditions and/or the formality of an event which the user U will attend.

The clothing data can include, for example, an inventory of the user's U items of clothing. More specifically, the clothing data can include one or more of: (i) the items of clothing owned by the user U; (ii) combinations of items of clothing previously worn by the user U; (iii) a history of where or when the user U has worn each item of clothing and/or combinations of items of clothing; and/or (iv) tags related to aspects of outfits and/or items of clothing such as color, pattern, type, formality, suitability for weather conditions, and/or the like. The clothing data can also include one or more clothing score regarding individual items of clothing and/or combinations thereof. A clothing score can be a numerical value assigned to a single item of clothing or a combination thereof for a specific category of clothing data. In an embodiment, the clothing scores can be determined based at least in part on an expert model developed to reflect the fashion opinions of a particular expert, as described in more detail below.

The situational data can be related to a condition or activity to be experienced by the user U on a given day. The situational data can include, for example, data regarding daily weather conditions, data regarding a user's U daily schedule, data regarding a person with whom the user U will interact on a given day, and/or any other data which could change on a daily basis and which could affect the clothing decisions made by the user U. The situational data can further include one or more situational score regarding daily weather conditions, the user's U daily schedule, a person within whom the user U will interact, and/or other variable daily conditions which could affect the user's U clothing choices. A situational score can be a numerical value assigned to signify, for example, the severity of the weather, the formality of a scheduled event, the preferences of the person with whom the user U will interact, and/or the like.

The back end processing instructions 50 can be operatively coupled to both the web interface 46 and the database 48, and can be programmed into and/or stored by the central memory 42 and implemented by the central processor 40. In an embodiment, the back end processing instructions 50 can be executed by the central processor 40 to direct operations of the central server 14 as described below in further detail. For example, the central processor 40, executing the back end processing instructions 50, can manage the receipt, storage, maintenance, etc. of clothing data and/or situational data relevant to a clothing recommendation for a user U.

Figure 3:
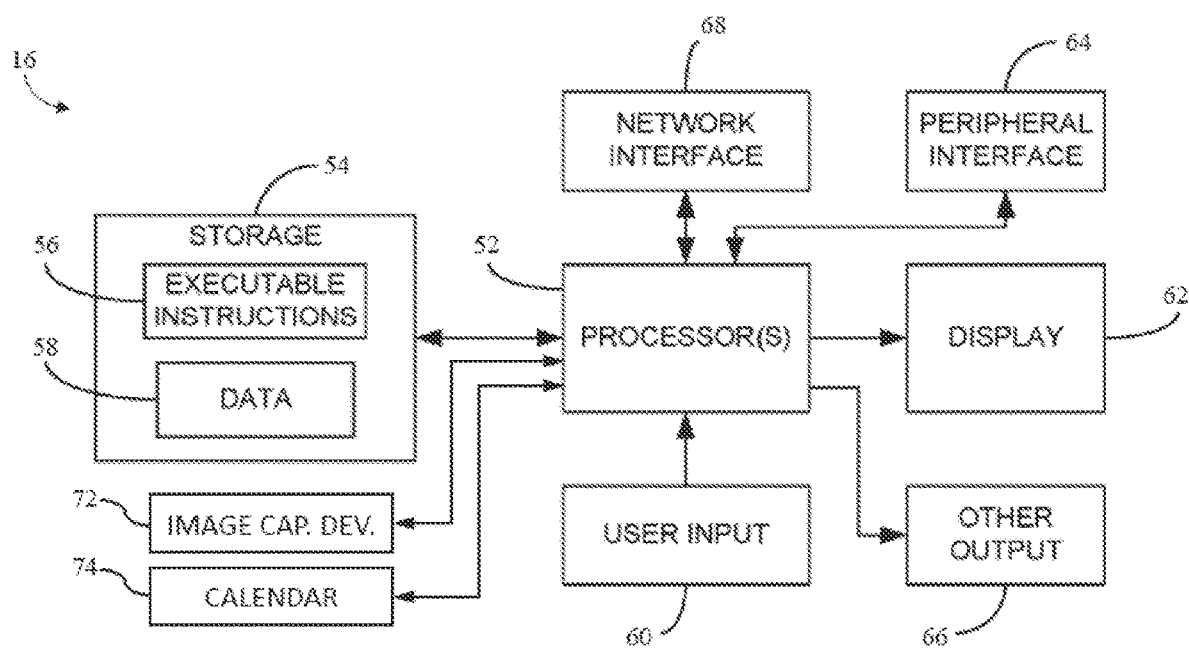
FIG. 3 is a representative diagram of an example embodiment of a user terminal which can be used by the system of FIG. 1.

The user terminal 16 can be a cellular phone, a tablet, a personal computer, or another electronic device controller by the user U which communicates with the mirror unit 12 and/or the central server 14. FIG. 3 illustrates a representative diagram of an example embodiment of a user terminal 16. In an embodiment, FIG. 3 can also represent an example embodiment of the components of the mirror unit 12 (e.g., the user terminal 16 can be located at the mirror unit 12 and/or replace the controller 22).

It should be understood that the system 10 described herein does not require a user terminal 16. All of the functions of the user terminal 16 can be performed at the mirror unit 12, such that the mirror unit 12 is self-contained. Thus, any function or element described herein as being performed by or included at the user terminal 16 can also be performed by or included at the mirror unit 12.

As illustrated, a user terminal 16 can include a terminal processor 52 and a terminal memory 54. The terminal processor 52 is configured to execute instructions programmed into and/or stored by the terminal memory 54. The instructions can be received from and/or periodically updated by the central server 14 in accordance with the methods discussed below. As described in more detail below, many of the steps of the methods described herein can be stored as instructions in the terminal memory 54 and executed by the terminal processor 52.

In an embodiment, the terminal processor 52 can comprise one or more of a microprocessor, a microcontroller, a digital signal processor, a co-processor or the like or combinations thereof capable of executing stored instructions 56 and operating upon stored data 58, wherein the instructions 56 and/or data 58 are stored by the terminal memory 54. Likewise, the terminal memory 54 can comprise one or more devices such as volatile or nonvolatile memory, for example, random access memory (RAM) or read only memory (ROM). Further still, the terminal memory 54 can be embodied in a variety of forms, such as a hard drive, optical disc drive, floppy disc drive, etc. In an embodiment, many of the processing techniques described herein are implemented as a combination of executable instructions and data within the terminal memory 54. In an embodiment, the user terminal 16 can be a component of the mirror unit 12, with the terminal processor 52 replacing the unit processor 32 and the terminal memory 54 replacing the unit memory 34. In an embodiment, the controller 22 can be located at the user terminal 16, such that the terminal processor 52 operates as the unit processor 32 and the terminal memory 54 operates as the unit memory 34.

As illustrated, a user terminal 16 can include one or more user input device 60, a display 62, a peripheral interface 64, one or more other output device 66, and a network interface 68 in communication with the terminal processor 52. The user input device 60 can include any mechanism for providing a user input to the terminal processor 52, for example, a keyboard, a mouse, a touch screen, a microphone and/or suitable voice recognition application, or another input mechanism. The display 62 can include any conventional display mechanism such as a cathode ray tube (CRT), a flat panel display, a touch screen, or another display mechanism. Thus, as can be understood, the user input device 60 and/or the display 62 and/or any other suitable element can be considered a GUI 70 of the user terminal 16. The peripheral interface 64 can include the hardware, firmware, and/or other software necessary for communication with various peripheral devices, such as media drives (e.g., magnetic disk or optical disk drives), other processing devices, or any other input source used as described herein. Likewise, the other output device 66 can optionally include similar media drive mechanisms, other processing devices or other output destinations capable of providing information to a user U of the user terminal 16, such as speakers, LEDs, tactile outputs, etc. The network interface 68 can comprise hardware, firmware and/or software that allows the terminal processor 52 to communicate with other devices via wired or wireless networks 18, whether local or wide area, private or public. For example, such networks 18 can include the World Wide Web or Internet, or private enterprise networks, or the like.

The user terminal 16 can also include an image capturing device 72, which can be used in place of or in addition to the image capturing device 26 of the mirror unit 12. The image capturing device 72 can include a camera configured to record one or more image (e.g., still images, videos, etc.) of a user U. The image capturing device 72 can also be configured to convert images into digital files which can thereafter be processed in accordance with the methods discussed herein. The image capturing device 72 can further be configured for the sharing of images and/or tracking the user's collection of clothing.

The user terminal 16 can also include a digital calendar 74. The digital calendar 74 can be, for example, a calendar application which is downloaded to the user terminal 16 and/or stores the user's U past, present, and/or future commitments. In an embodiment, the digital calendar 74 can include a level of formality for one or more scheduled meeting and/or a listing of the people who will be present at the meeting. In an embodiment, the digital calendar 74 can be associated with the user's U email. The digital calendar 74 can be stored on the terminal memory 54, or can be stored on an alternative memory device and accessed by the user terminal 16 via wireless communication over the network 18. In an embodiment, relevant data from the digital calendar 74 can be stored as data 58 within the terminal memory 32 and accessed by the mirror unit 12 and/or central server 14 as needed.

While the user terminal 16 has been described as one form for implementing the techniques described herein, those of ordinary skill in the art will appreciate from this disclosure that other functionally equivalent techniques can be employed. For example, some or all of the functionality implemented via executable instructions can also be implemented using firmware and/or hardware devices such as application specific integrated circuits (ASICs), programmable logic arrays, state machines, etc. Further, other implementations of the user terminal 16 can include a greater or lesser number of components than those illustrated. Further still, although a single user terminal 16 is illustrated in FIG. 4, it should be understood from this disclosure that a combination of such devices can be configured to operate in conjunction (for example, using known networking techniques) to implement the methods described herein.

Figure 4:
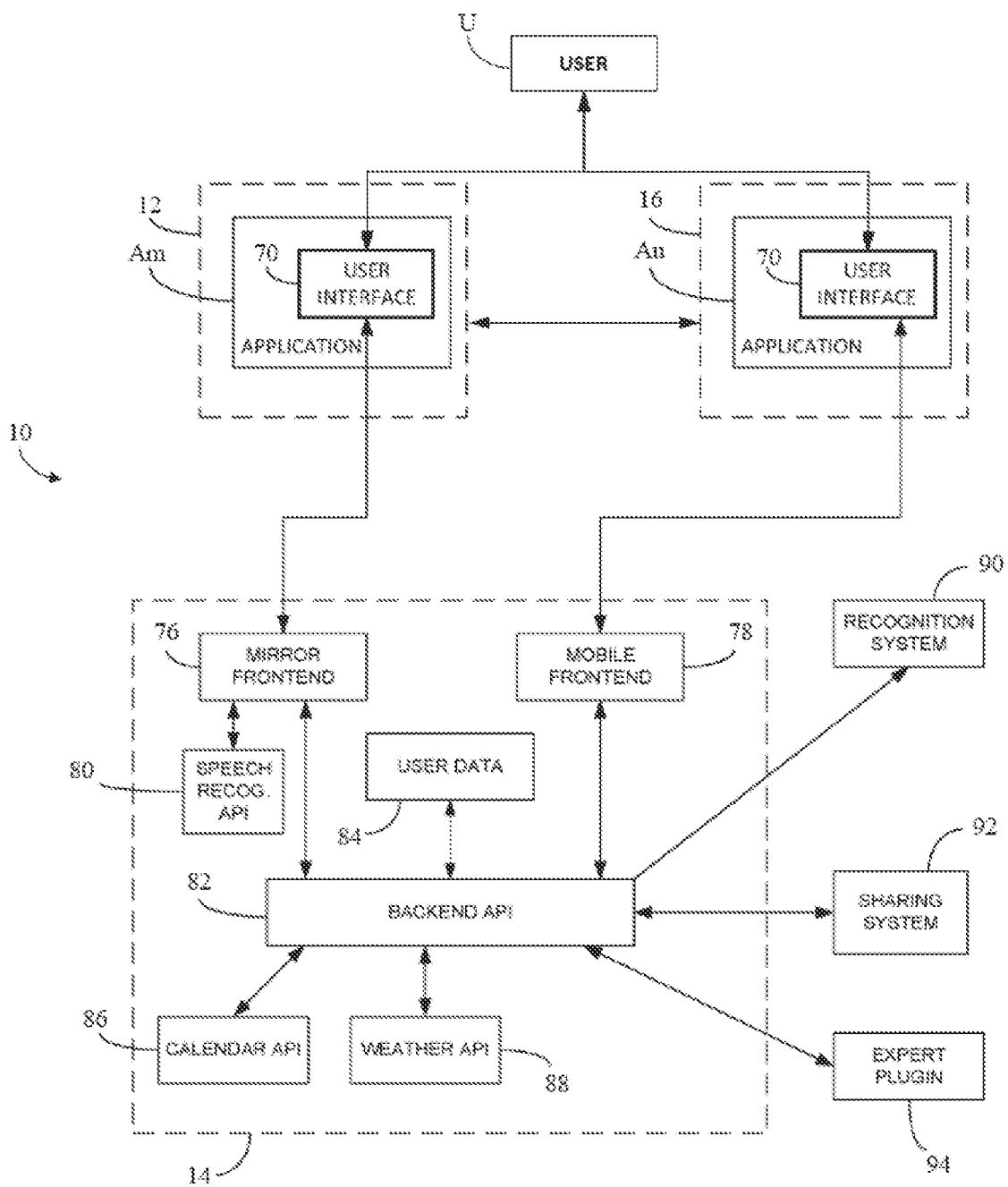
FIG. 4 is block diagram showing an example embodiment of various processing elements utilized by the system of FIG. 1.

FIG. 4 is a block diagram showing a more detailed implementation of how the system 10 can function as a tool to assist a user U with clothing recommendations. In FIG. 4, the mirror unit 12 implements an application Am, which can in turn implement the GUI 38 using the display screen 24a. Likewise, the user terminal 16 implements an application Au, which can in turn implement the GUI 70 using the display 76. The GUIs 38, 70 thereby allow a user U of the mirror unit 12 and/or the user terminal 16 to interact with the central server 14. The applications Am, Au can be downloaded from the central server 14 or from some other source such as an application distribution platform.

As shown, the central server 14 can implement several operational components. For example, the web interface 46 can implement various frontend 76, 78 functions. In the illustrated embodiment, a mirror frontend 76 and a mobile frontend 78 are provided. In an embodiment, the mirror frontend 76 and mobile frontend 78 operate in essentially the same manner, with the exception that the mirror frontend 76 operates in conjunction with a speech recognition application programming interface ("API") 80 for implementing control functions, whereas the mobile frontend 78 relies on user input mechanisms of the user terminal 16 (e.g., touchscreen, keyboard, etc.) for implementing control functions.

In operation, the mirror frontend 76 performs various ones of the functions described herein in conjunction with the backend API 82. For example, the mirror frontend 76 can cause the display of one or more image at the mirror unit 12 using the display screen 24a, including the display of clothing recommendations or other information such as the current weather, time, and upcoming events that the user U has on his or her calendar. As noted above, the mirror frontend 76 can support a speech recognition API 80, which can be the main method of interaction between the user U and the mirror unit 12. For example, in a current embodiment, the speech recognition API 80 can comprise the Annyang speech recognition API. In operation, user speech can be captured by the microphone 28 and transmitted from the mirror unit 12 to the mirror frontend 76 via the network 18. In turn, the speech recognition API 80 can record what the user U says in a transcript and return the transcript when the user U stops talking. The mirror frontend 76 can include a number of commands (e.g., "recommendation." "take a picture," "share picture," etc.) that can be used to control operation of the mirror unit 12. The mirror frontend 76 can also analyze the transcript provided by the speech recognition API 80 to see if it includes matches to any of the commands maintained by the mirror frontend 76. If a match is found, the mirror frontend 76 can execute the correlated function, which can require calls to the backend API 82 to implement the desired functionality, e.g., retrieving clothing recommendations along with pictures, changing outfits, indicating items of clothing as favorites, and sending images to be processed.

The database 50 can implement a user data storage 84 that includes all data relevant to each user U, including clothing data. Further, execution of the back end processing instructions 58 can cause the backend API 82 to execute the management logic necessary to operate the frontends 76, 78. To this end, the backend API 82 can provide relevant data to the mirror unit 12 and frontends 76, 78 as well as perform processing that is not otherwise performed by the frontends 76, 78, mirror unit 12, or user terminal 16. As further shown, the backend API 82 can communicate with the user data storage 84, a calendar API 86, weather API 88, a recognition system 90, a sharing system 92 and an expert plugin database 94.

The calendar API 86 can provide the backend API 82 access to a given user's U digital calendar 74 such that data obtained from the user's U digital calendar 74 can be displayed by the mirror unit 12. Information obtained from the user's U digital calendar 74 can include, for example, information regarding a meeting that the user U has scheduled for a given day, a level of formality of the meeting, and/or one or more people that the user U will interact with at the meeting. The system 10 can obtain or generate situational data and/or scores based on this information.

The weather API 88 can allow the backend API 82 to access weather data (e.g., a third party weather site) relevant to the user's location (e.g., stored as a user attribute in the user data storage 84) for display via, the mirror unit 12. The system 10 can obtain or generate situational data and/or scores based on this weather data.

The recognition system 90 can operate to identify and extract images of individual items of clothing from an image of a user wearing a particular outfit, and can further operate to tag identified items of clothing with various attributes (e.g., type, color, pattern, etc.). The data extracted by the recognition system 90 can be used to build a wardrobe database for the user U and/or to obtain or generate clothing data and/or scores for the user's U wardrobe database.

In an embodiment, the backend, API 82 can implement a wardrobe database including a listing of individual items of clothing for that user U (which can be stored, e.g., in the user data storage 84). Thus, when a user U takes a picture of an outfit they have chosen to wear, the backend API 82 compares the clothing in the image against the wardrobe database to see if the clothing is already listed. If not, i.e., it's a new piece of clothing, then the image can be processed via the recognition system 90 to extract an image of one or more item of clothing that is subsequently tagged with information used by a recommendation algorithm and thereafter stored in the user data storage 84.

Optionally, the backend API can further implement a makeup database and/or a hairstyle database. The makeup database can include a listing of individual items of makeup available to the user U, along with corresponding tags or scores regarding use with various weather conditions and/or compatibility with different items of clothing. Likewise, the hairstyle database can include a listing of individual hair products available to the user U or hairstyles that the user U is willing to wear, along with corresponding tags or scores regarding use with various weather conditions and/or compatibility with different items of clothing and/or compatibility with a model, designer, celebrity, or other look that the user is trying to emulate. Price is another consideration for the database for all of these clothing, makeup, hairstyle, and other factors. Users may want a look but are unwilling or unable to afford certain looks and so will need other lower or higher cost options. The backend API can search for such options.

The sharing system 92 is one or more mechanism for accessing social media platforms or other communication channels (e.g., messaging, email, etc.). In an embodiment, the user's U "friends" can comment on the user's U clothing choices (e.g., approve/disapprove or rate), which comments can then cause the system 10 to update the user's U clothing data and/or scores. Likewise, the user U can receive comments regarding makeup and/or hairstyle choices. In an embodiment, the user U can choose which friends' comments will affect the user's U clothing data and/or scores.

The expert plugin database 94 can include one or more trained expert model that reflects the clothing recommendations of one or more expert in the field, e.g., designers, stylists, influencers, etc, Each trained expert model can include an algorithm which is developed and weighted based on the preferences of a particular expert. In an embodiment, each of a plurality of experts can develop his or her own expert model that is specific to his or her individual fashion preferences, and the user U can utilize the expert model of any particular expert which the user U desires. For example, if the user U follows a particular influencer and likes that influencer's particular style, then the user U can use that influencer's expert model to guide his or her clothing choices and imitate that influencer's style. In this way, the system 10 enables so-called experts to monetize their fashion sense by developing specific expert models that can be purchased/downloaded by the user U for use with the mirror unit 12.

In an embodiment, an expert model can be trained based on a survey taken by an expert (e.g., a designer, stylist, influencer, celebrity, etc.). The survey can include a number of questions which determine the expert's fashion preferences and rules. For example, the survey can determine the expert's favorite items of clothing, combinations of items of clothing, colors, patterns, styles, etc. Based on this information, the expert model can develop clothing data including weighted preferences and/or rules which can be used to enable the system 10 to generate the clothing recommendations discussed herein. For example, if an expert prefers a specific style of clothing, then that expert's model will weight items of that particular style more heavily than items of other styles. On the other hand, if the expert disfavors a specific style of clothing, then that expert's model will weight items of that particular style more lightly than items of other styles. The expert model can also include rules which disqualify particular styles, colors, patterns, etc. which the expert would not wear. In this way, the expert model is trained to reflect the preferences of a particular expert. In an embodiment, the expert model can be developed based on the user U or the user's U significant other or friend taking e survey (i.e., the friend or significant other can be considered an "expert").

In an embodiment, the expert plugin database 94 can include a plurality of expert models that are available to be downloaded by the system 10 and used in accordance with the methods discussed herein. In an embodiment, the system 10 can access a plurality of expert models, and can enable the user U to select which expert model the user U would like to use on any given day. In another embodiment, a particular expert model can be used as a starting point for the user's U preferences (e.g., supply initial clothing data), and the weights in the expert model can then be modified by the system 10 based on input from the user U. In this way, the expert's opinion can be reflected in the recommendations, but the recommendations can still be tailored to the user U.

In making recommendations, the system 10 can implement a decision model in which pairings of items of clothing are assessed based on a se of rules such that every possible outfit (e.g., combination of items of clothing) can be scored based on the stored rules. The stored rules can be based on an expert model developed or downloaded by the system 10. For example, each possible color combination can have a score. Further, when individual items of clothing are tagged as described above, that item will include an attribute specifying the types of weather conditions the item is most suitable for. Similarly, clothing item tags can include attributes indicating their suitability for different types of occasions, e.g., formal, casual, business casual, sporty, active wear, etc. Thus, any given clothing recommendation can be based on the obtained knowledge of the weather and any upcoming calendar events, as well as other attribute combinations (colors, patterns, etc.). Constructed in this manner, the above-noted expert models from the expert plugin database 94 can constitute additional or superseding rules based on a particular expert's style sense.

Figure 5:
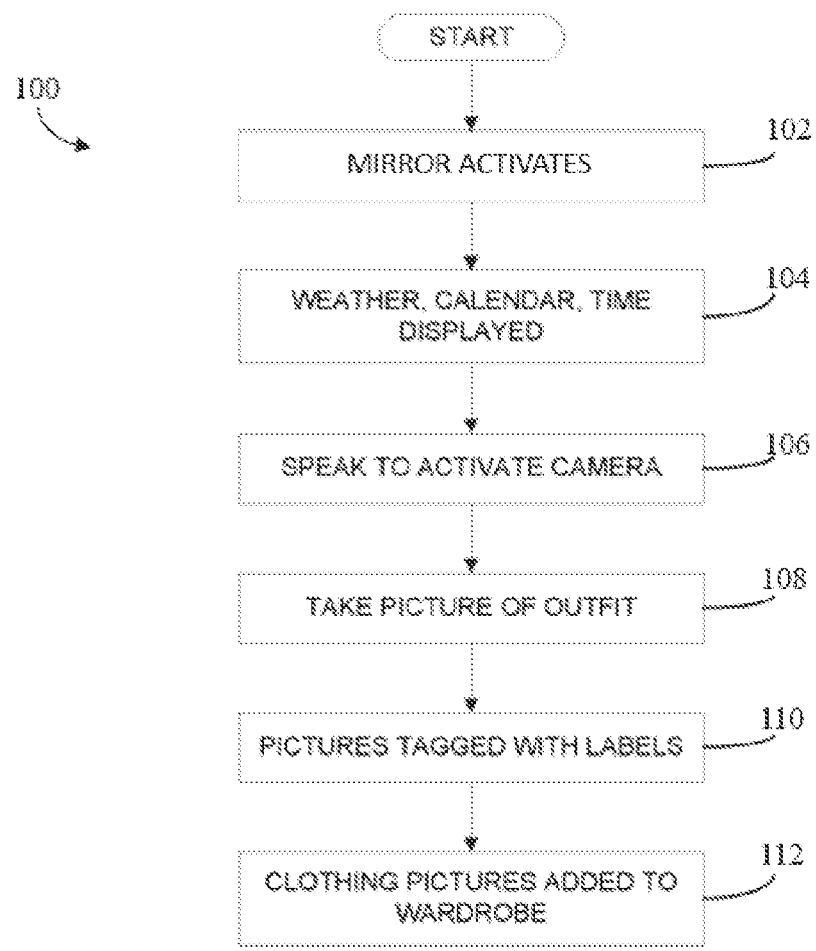
FIG. 5 is a flow chart showing an example embodiment of a method for building a wardrobe database which can be used by the system of FIG. 1 to generate a clothing recommendation.

FIG. 5 illustrates an example embodiment of a method 100 for building a wardrobe database which can be used by the system 10 to generate a clothing recommendation. Some or all of the steps of method 100 can be stored as instructions on a memory discussed herein and can be executed by a processor discussed herein. It should be understood that some of the steps described herein can be reordered or omitted without departing from the spirit or scope of method 100.

In an embodiment, a wardrobe database as described herein can be stored by any and/or all of the unit memory 34, the central memory 42, and/or the terminal memory 54. The wardrobe database can include an inventory of the outfits and/or individual items of clothing owned by the user U. The wardrobe database can further include clothing data as discussed herein. In an embodiment, the inventory of outfits and/or individual items of clothing can be combined with the clothing data, for example, by storing a table which includes outfits and/or individual items and associated data such as tags or scores related to the various categories discussed herein. The wardrobe database can further include date information related to the amount of time that has passed since a user U last wore a particular outfit and/or individual item of clothing.

At step 102, the mirror unit 12 activates the display device 24. For example, the mirror unit 12 can be programmed to activate the display device 24 at a predetermined time, such as the user's U normal time for waking up in the morning. Alternatively, the mirror unit 12 can include a sensor which detects when the user U is standing in front of the mirror unit 12, and the mirror unit 12 can activate the display device 24 upon a detection of the user U by the sensor. Alternatively still, the user U can manually activate the mirror unit 12. In an embodiment, the mirror unit 12 can include a login or biometric identifier which distinguishes the user U from a plurality of users U who utilize the same mirror unit 12.

At step 104, the system 10 can obtain situational data, for example, by accessing the users U digital calendar 74, the calendar API 86, and/or the weather API 88. The situational data can be generated based on information gathered from a third party. The situational data can include data related to the situations that the user U will face that day, for example, weather data and/or calendar data. The system 10 can obtain weather and/or calendar data, for example, via the backend API 82 and mirror frontend 76 as described above, and then cause the weather data and/or calendar data to be displayed using the display screen 24*a*. The weather data can include information regarding the expected weather conditions for that day. The calendar data can include a listing of any events or appointments in the user's U calendar that can potentially impact the user's decision regarding what to wear that day. In an embodiment, the calendar data can include, for example, information regarding the formality and/or attendees of a particular meeting on the user's U schedule.

In an embodiment, the display screen 24*a* at step 104 can include an initial clothing recommendation for the day given the obtained calendar and weather information. For example, if the user U has a meeting with hillier boss and it is a cold day, the initial clothing recommendation can recommend formal clothing that is suitably warm. On the other hand, if the user U is meeting an old friend for lunch and it is a warm day, the initial clothing recommendation can suggest casual clothing that would be suitable for eating outside at a restaurant. In another example, if the user U is meeting a person who likes a particular color, style, etc., then the clothing recommendation can suggest that color, style, etc. The clothing recommendation can be generated, for example, using the method 200 discussed below. In an embodiment, the initial clothing recommendation can be generated based on an expert model of the user's U choosing.

At step 106, the user U has selected and put on an outfit. The outfit can include clothing recommended by the mirror unit 12 at step 104, or the outfit can include different clothing chosen by the user U. Once the user U has the outfit on, the user U can activate the image capturing device 26. For example, the user U can speak a suitable command to instruct the mirror unit 12 to activate the image capturing device 26, e.g., by speaking "camera on" into the microphone 28. "Camera on" or other commands can be recognized by the system 10 in accordance with the speech recognition API 80 as described above.

At step 108, the image capturing device 26 records one or more image of the user's U outfit. The one or more image can include one or more still image and/or video, which can then be displayed to the user U using the display screen 24a. In an embodiment, the image capturing device 26 can display images and/or video of the user U on the display screen 24a in real time. The one or more image can subsequently be converted to a digital file and transferred to the backend API 82.

At step 110, the one or more image can be tagged or scored, for example, if the overall outfit and/or one or more item of clothing in the image is new to the user's U wardrobe. The image can be tagged, for example, as formal or casual, as suitable for various weather conditions, based on color, pattern, type, and/or various other criteria. The image can further be tagged based on the like/dislike of individuals with whom the user U could meet on a given day. The image can be also scored with numerical values, for example, based on formality, suitability for various weather conditions, color, pattern, type, and/or various other criteria. In an embodiment, the user U can provide tags or scores regarding the outfit and/or individual items of clothing that make up the outfit. Alternatively, the image can be processed by the recognition system 90, such that the tags or scores are automatically generated. In an embodiment, the display device 24 can inform the user U of initial tags or scores for one or more items of clothing based on an expert model currently being utilized by the system 10, and the user U can then accept and/or change the initial tags or scores based on the user's U personal preferences.

At step 112, the one or more image and its corresponding tags/scores can be saved as the user's U clothing data related to that outfit and/or items of clothing within that outfit. The user's U wardrobe database can include a plurality of such clothing data. In an embodiment, the wardrobe database can store clothing data that includes one or more tags for each item of clothing in an image. The wardrobe database can further store clothing data that includes one or more clothing score for each item of clothing in an image. The wardrobe database can further store the images associated with such tags/scores. Alternatively or additionally, the image taken at step 110 can include multiple items of clothing owned by the user U, can be saved as a combination of the items of clothing (e.g., as an outfit), and/or can be marked for the day that the image was taken.

Figure 6:
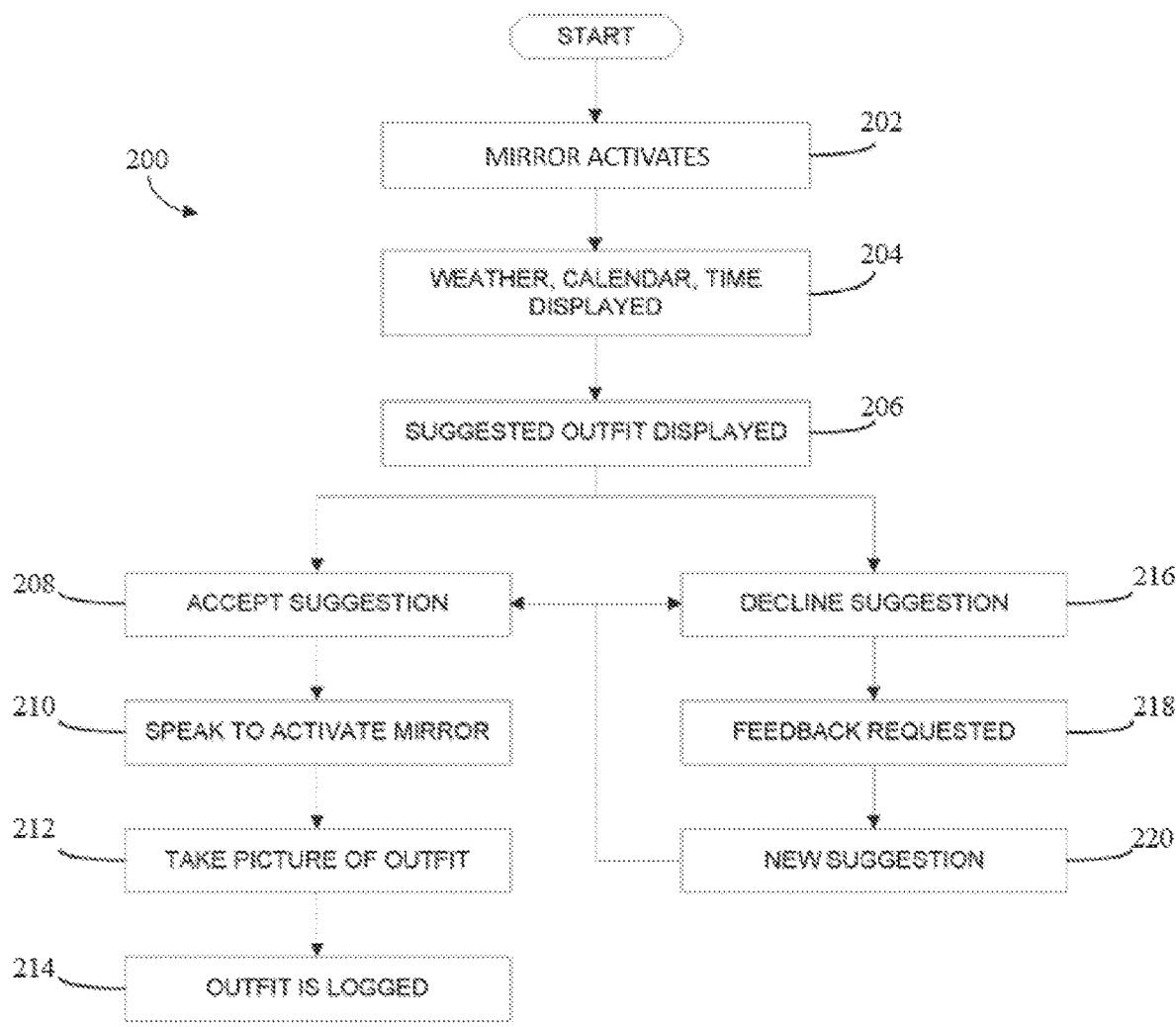
FIG. 6 is a flow chart showing an example embodiment of a method for generating a clothing recommendation using the system of FIG. 1.

FIG. 6 illustrates an example embodiment of a method 200 for generating clothing recommendations at the mirror unit 12. The clothing recommendations can be generated, for example, using the wardrobe database generated during method 100. The clothing recommendations can also be generated, for example, using the wardrobe database in combination with an expert model from the expert plugin database 94. Some or all of the steps of method 200 can be stored as instructions on a memory discussed herein and can be executed by a processor discussed herein. It should be understood that some of the steps described herein can be reordered or omitted without departing from the spirit or scope of method 200.

At step 202, the mirror unit 12 activates the display device 24. For example, the mirror unit 12 can be programmed to activate the display device 24 at a predetermined time, such as the user's U normal time for waking up in the morning. Alternatively, the mirror unit 12 can include a sensor which detects when the user U is standing in front of the mirror unit 12, and the mirror unit 12 can activate the display device 24 upon a detection of the user U by the sensor. Alternatively still, the user U can manually activate the mirror unit 12. In an embodiment, the mirror unit 12 can include a login or biometric identifier which distinguishes the user U from a plurality of users U who utilize the same mirror unit 12.

At step 204, the system 10 can obtain situational data, for example, by accessing the user's U digital calendar 74, the calendar API 86, and/or the weather API 88, The situational data can be generated based on information gathered from a third party. The situational data can include data related to the situations that the user U will face that day, for example, weather data and/or calendar data. The system 10 can obtain weather and/or calendar data for example, via the backend API 82 and mirror frontend 76 as described above, and then cause the weather data and/or calendar data to be displayed using the display screen 24a. The weather data can include information regarding the expected weather conditions for that day. The calendar data can include a listing of any events or appointments in the user's calendar that can also impact the user's decision regarding what to wear that day. In an embodiment, the calendar data can include, for example, information regarding the formality and/or attendees of a particular meeting on the user's U schedule.

At step 206, the system 10 can generate a clothing recommendation for the user using information from the user's U wardrobe database and/or an expert model selected by the user U. More specifically, the system 10 can generate the clothing recommendation using clothing data and/or situational data. In an embodiment, the system 10 can calculate a clothing score based on the clothing data and/or a situational score based on the situational data, and the system 10 can generate the clothing recommendation based on the clothing score and/or a situational score.

Here, the clothing data can be obtained fully or partially from an expert model selected by the user U. In this way, the clothing recommendation made by the system 10 can be weighted based on the fashion preferences of an expert whose style is appreciated by the user U. In an embodiment, the weights applied by the clothing data can be obtained entirely from the expert model. In another embodiment, the weights applied by the clothing data can be a blend of both the expert model and the user's U personal preferences. For example, the expert may not approve of a certain color, but if the user U likes that color then the user U can increase a weight related to that color.

In an embodiment, each item of clothing can have clothing score. Factors that can be used to calculate the clothing score include, for example, (i) the fashionability of the item, (ii) how recently the user U has worn the item, (iii) the user's preference for the item, the type of item, the color of the item, the pattern of the item, etc.; (iv) and/or other factors related to the specific item of clothing. The item score can be determined by the expert model and/or the user's U personal preferences. The fashionability of the item can be determined, for example, using the expert model from the expert plugin database 94, which can cause items which are currently fashionable to be scored higher than items which are not fashionable according to current trends (e.g., colors, patterns, styles, etc. recommended by fashion experts). How recently the user U has worn the item can be determined, for example, based on past recommendations and/or images taken by the user U using the mirror unit 12 in accordance with method 100. The user's U preference for the item can be determined, for example, based on a score given to the item by the user U and/or how often the user U wears the item. In an embodiment, the system 10 can calculate the clothing score based on the number of times the user U has worn the item over a predetermined number of days.

The clothing score can be for one item or a plurality of items. If the clothing score is for one item of clothing, then that item's clothing score can be used as the overall clothing score. If the clothing score is for an outfit including a plurality of items, then an overall clothing score can be calculated based on a plurality of the clothing scores for individual items in the outfit. In calculating the clothing score from a plurality of items, the overall clothing score can be weighted upward or downward based on the compatibility of different items' colors, patterns, styles, etc. Thus, combinations of items which are not compatible will receive low overall clothing scores and thus not generally be recommended to the user U.

In an embodiment, an overall clothing score can be calculated without individual clothing scores, for example, in the same ways that individual clothing scores for individual items are calculated. That is, overall outfits can be stored in the database without separating individual items that make up the outfit. A clothing score for an outfit can be calculated, for example, based on (i) the fashionability of the outfit, (ii) how recently the user U has worn the outfit, (iii) the user's preference for the outfit, the type of outfit, the color of the outfit, the pattern of the outfit, etc.; (iv) and/or other factors related to the overall outfit. The fashionability of the outfit can be determined, for example, using the expert model from the expert plugin database 94, which can cause outfits which are currently fashionable to be scored higher than outfits which are not fashionable according to current trends. How recently the user U has worn the outfit can be determined, for example, based on past recommendations and/or images taken by the user U using the mirror unit 12 in accordance with method 100. The user's U preference for the outfit can be determined, for example, based on a score given to the outfit by the user and/or how often the user U wears the outfit. In an embodiment, the system 10 can calculate the clothing score based on the number of times the user U has worn the outfit over a predetermined number of days.

In an embodiment, the situational score can be based on at least one situation that the user U will face that day; e.g., based on the weather and/or planned meetings. In an embodiment, each item of clothing and/or complete outfit can be scored for different situations, e.g., have a weather score and a formality score which are weighted based on current weather conditions and planned meetings. Thus, upon determining the weather and/or planned meetings for the day, the system 10 can automatically assign the situational score (e.g., including the weather score and/or style score) for each item of clothing and/or complete outfit. In an embodiment, the situational score can further be based on preferences of an individual which the user U plans to meet on a given day.

In an embodiment, a total score can be generated based on at least one clothing score and/or at least one situational score. In this embodiment, various factors can cause one of the clothing score and the situational score to be weighted higher than the other. For example, the user U may have a preference for style over substance and thus prefer for the clothing score to be weighted more heavily. Likewise, the user U may have a preference for wearing appropriate attire for an appropriate situation and thus prefer for the situational score to be weighted more heavily. In an embodiment, the total score (TS) can be calculated as follows.

$$TS=(W1\times CS)+(W2\times SS). \quad \text{(Equation 1)}$$

In Equation 1, W1 is a weight for the clothing score (CS), while W2 is a weight for the situation score (SS). The expert model and/or the user's U preferences can determine the weights W1 and W2. In an embodiment, the system 10 can automatically determine the weights based on the expert model, such that the weights reflect the user's U favorite expert's fashion sense.

In an embodiment, the system 10 can automatically determine the weights based on past decisions made by the user U regarding clothing decisions. For example, if the user U repeatedly ignored the weather as a factor when making previous decisions, the system 10 can reduce the weight of the situational score and/or increase the weight of the clothing score. In another example, the system 10 can adjust the weights based on how the user U has tolerated the weather in the past. For example, some people can tolerate weather differently than others, and the system 10 can adjust the weights so that a particular user's U tolerances are reflected by the weights. Specific categories of the clothing data and/or the situational data can also receive individual corresponding weights in more complicated embodiments of the above calculation.

In an embodiment, the weight W1 of the clothing score can depend on information retrieved from the expert plugin database 94. For example, the weight W1 can be based on the fashionability of clothing according to fashion experts, stylists, influencers and the like. That is, if clothing is determined to by fashionable by a particular expert, then it can receive a higher weight W1 according to that expert's expert model, whereas nonfashionable clothing will receive a lower weight W1 according to that expert's expert model. In this way, the user U can imitate the fashion style of any expert he or she wishes.

The system 10 can use the calculated total scores to generate a plurality of clothing suggestions for the user U. In an embodiment, the system 10 can compile a list of a plurality of clothing suggestions (e.g., outfits or items) which are ranked according to the total score. The mirror unit 12 can then display a clothing suggestion of the plurality of clothing suggestions using the display device 24. The clothing suggestion can be the clothing suggestion which received the highest total score compared to the rest of the plurality of clothing suggestions. In an embodiment, the mirror unit 12 can display a plurality of clothing suggestions using the display device 24, with the plurality of clothing suggestions displayed in an order which reflects a ranking based on the total scores.

In an embodiment, the system 10 can disqualify one or more outfit/item from the plurality of clothing suggestions if the user U has worn the outfit and/or an item of clothing within a predetermined number of days. In this way, the system 10 can ensure that the user U mixes up his or her wardrobe and does not constantly wear the same outfits/ items to the chagrin of fashion experts.

Figure 7:
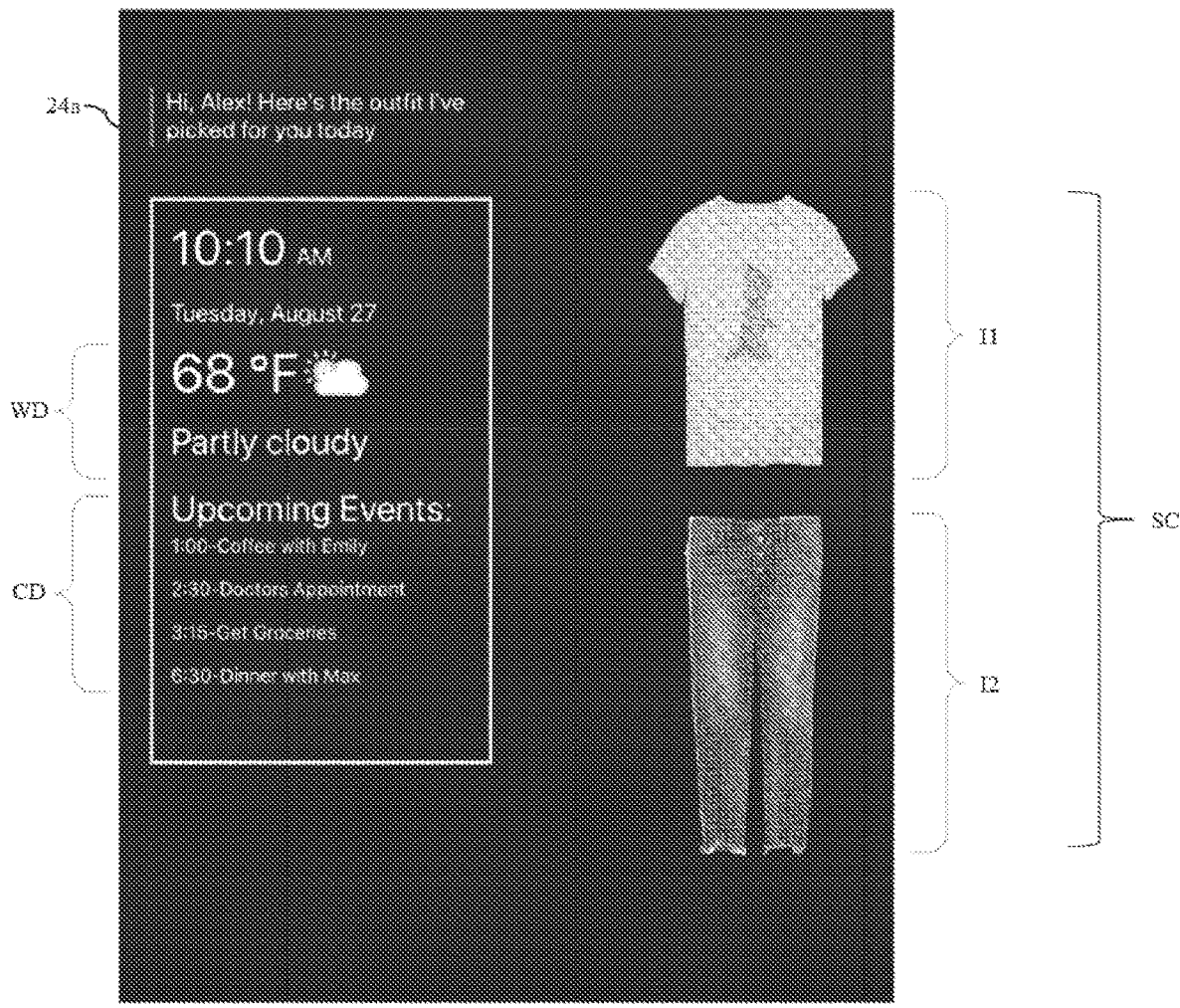
FIG. 7 illustrates an example embodiment of a clothing recommendation which can be generated by the system of FIG. 1.

In an embodiment, the user U can further disqualify one or more outfit/item of clothing from the plurality of clothing suggestions. For example, the user U can specify that he or she does not want to wear a specific color or pattern, upon which the system 10 can disqualify one or more outfit/item tagged with that specific color or pattern. For example, if the user U says that he or she does not wish to wear the color red, then the system 10 can disqualify any outfit/item tagged as "red," or the system 10 can disqualify any outfit including an item of clothing tagged as "red." In another example, the system 10 can disqualify one or more outfit/item from the plurality of suggested clothing based on the calendar date (e.g., disqualify white clothing and/or shorts after Labor Day). FIG. 7 illustrates an example embodiment showing the display of a clothing suggestion on the display screen 24a (the rest of the mirror unit 12 is not shown in FIG. 7). As shown, in addition to the weather data WD and the calendar data CD, the display screen 24a includes an image of suggested clothing SC including a first item of clothing 11 and a second item of clothing 12.

In the embodiment shown in FIG. 7, the suggested clothing SC is displayed without a photograph or video of the user U. In another embodiment, the mirror unit 12 can record a real-time image (e.g., still image, video, etc.) of the user U using the image capturing device 26, and the controller 22 can then superimpose the suggested clothing SC over the user U in the image and then display the superimposed image using the display device 24, so that the user U can see what he or she would look like wearing the outfit right then. This can save the user U the time of actually trying on the outfit and looking in the mirror 20 with the outfit on. This can further allow the user U to compare the superimposed outfit on the display screen 24a with the outfit he or she is currently wearing which is reflected by the front side 20a of the mirror 20, such that the user U does not need to constantly change outfits to compare outfit Options on any given day.

In an embodiment, the user U can specify one or more item of clothing that he or she intends to wear that day, and the clothing recommendation can be for an additional item of clothing to be worn with the intended item. For example, in FIG. 7, the user U can specify that he or she will be wearing the jeans (item 12), and the clothing recommendation can be for the shirt (item 11), in this way, the system 10 enables the user U to build an outfit around one or more particular item of clothing that the user U wishes to wear on any given day. Though not shown in FIG. 7, the suggested clothing can include one or more accessories to be worn with garments, or vice versa.

The user U can then be given the option of accepting or declining the suggested clothing. If the user U accepts the suggested clothing, the method 200 can proceed to step 208. If the user declines the suggested clothing, the method 200 can proceed to step 216.

In an embodiment, the system 10 can cause the clothing recommendation to be displayed to the user via the user terminal 16. In this way, the system 10 can further provide clothing recommendations to the user when the user is not directly utilizing the mirror unit 12.

Optionally, in an embodiment, the clothing recommendation can include a makeup and/or hairstyle recommendation. The makeup and/or hairstyle recommendation can be made, for example, based on the recommended outfit and/or based on the situational data. For example, certain types and/or colors of makeup can be better suited for certain outfits, in which case the system 10 can recommend makeup from the user's makeup database to go along the clothing recommendation. Likewise, certain types and/or colors of makeup or hair products are more suitable depending on weather conditions such as rain and humidity, and the system 10 can thus calculate scores based on the weather conditions and provide a makeup and/or hairstyle recommendation based thereon (e.g., which type of eyeliner would run less, which hair products are best suited for the current rain level and humidity, etc.). The scores for a makeup and/or hairstyle recommendation can be calculated in the same way as described above for items of clothing.

At step 208, the user U has accepted the suggested clothing. The user U then puts on the suggested clothing and thereafter activates the image capturing device 26 through a spoken command at step 210 so that the image capturing device 26 captures one or more image of the outfit at step 212. The one or more image can be one or more still image and/or video, which can then be displayed to the user U using the display screen 24a, In an embodiment, the image capturing device 26 enables the display of images and/or video of the user U on the display screen 24a in real time. The one or more image can subsequently be transferred to the backend API 82.

In an embodiment, the user's U acceptance of the suggested clothing can cause an update to one or more score related to the overall outfit and/or individual items of clothing making up the outfit. For example, one or more score can be automatically increased based on the user's U willingness to accept the outfit, which can indicate the user's U preference for that outfit or individual items of clothing making up the outfit. Further, a score related to weather or formality can be altered if the user U shows a willingness to wear a particular outfit or item of clothing during weather or social conditions that seem contrary to the current score.

At step 214, the outfit has been captured and one or more image has been logged as a reference of recently worn items. The image can be saved in the wardrobe database. In this manner, the display screen 24a can present the user U can with images of recently worn outfits so that he or she can avoid wearing certain outfits too frequently or to events where he or she has previously worn the same or a similar outfit. If the user LI has worn the same or a similar outfit recently or to a similar occasion, the system 10 can highlight the similarity for the user U and display the image from the previous occasion, so that the user U can use the images taken when deciding whether to accept a suggested clothing.

At step 216, the user U has declined the suggested clothing. In an embodiment, the mirror unit 12 can then display the suggested clothing having the next highest total score calculated at step 206.

Optionally, at step 218, the user U can indicate a reason why he or she rejected the suggested clothing. For example, the user U can speak recognized commands into the microphone 26 to indicate why the suggested clothing was not acceptable (e.g., "that shirt is not clean," "I don't like those shoes for a formal event," etc.). Based on this feedback, the system 10 can recalculate the total scores. In recalculating the total scores, the system 10 can remove clothing from consideration and/or adjust the weights being used to calculate the total scores. For example, if the user U says, "that shirt is not clean," then the system 10 can eliminate any outfit including the referenced shirt. If the user U says, "I don't want to wear red," then the system 10 can eliminate any outfit with a red item of clothing. If the user U says, "I'd like to look more formal," then the system 10 can increase a weight used in the calculation so that more formal items are weighted more heavily than casual items. Those of ordinary skill in the art will recognize from this disclosure that there are numerous ways to recalculate the total scores based on user feedback.

At step 220, the mirror unit 12 suggests second suggested clothing. In an embodiment, the second suggested clothing can be from the plurality of suggested items of clothing generated at step 206. The user U can then accept or reject the second suggested clothing and proceed to either step 208 or step 216 as described above. The user U can continue to reject outfits/items and cause the generation of new recommendations until the user U finds clothing that he or she deems acceptable for the day.

Based on the feedback provided at steps 208 to 220, the system 10 can constantly update the wardrobe database, including the scores and weights used in the calculations discussed herein, thus optimizing the wardrobe database to the user's U liking. Thus, each time the user U uses the system 10 and/or provides feedback, the system 10 improves its ability to make recommendations which are appreciated and accepted by the user U. Alternatively, the system 10 can rely entirely on the weights provided by an expert model selected by the user U.

Figure 8:
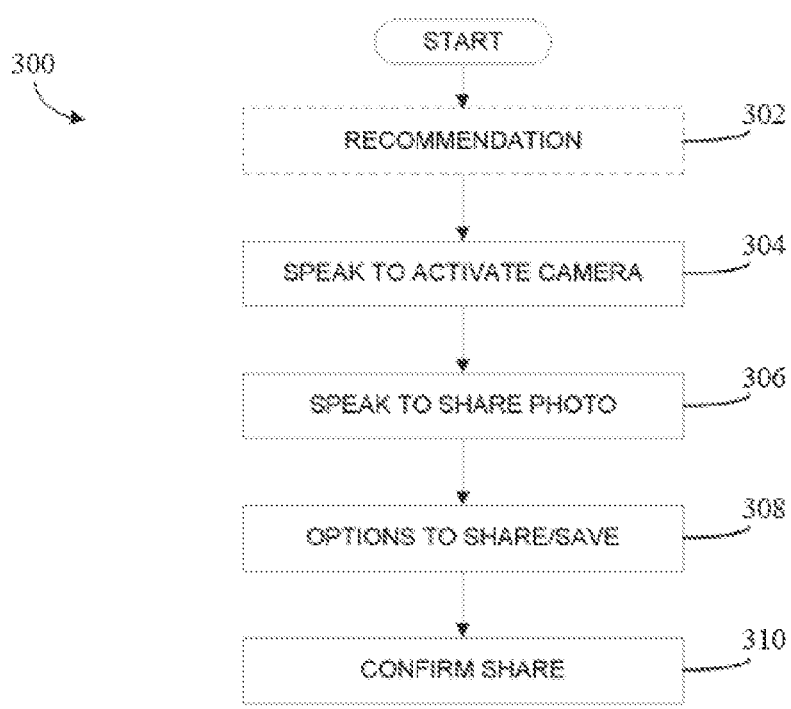
FIG. 8 is a flow chart showing an example embodiment of a method for sharing images resulting from a clothing recommendation generated by the system of FIG. 1.

FIG. 8 illustrates an example embodiment of a method 300 for sharing images of the user U. Some or all of the steps of method 300 can be stored as instructions on a memory discussed herein and can be executed by a processor discussed herein. It should be understood that some of the steps described herein can be reordered or omitted without departing from the spirit or scope of method 300.

At step 302, the user U has received and accepted a clothing recommendation as described above, or can have selected his or her own outfit.

At step 304, the user U can speak a suitable command to instruct the mirror unit 12 to activate the image capturing device 26, e.g., by speaking "camera on" into the microphone 28. "Camera on" or other commands can be recognized by the system 10 as described above. The image capturing device 26 can thereafter take one or more image of the user's U outfit. The one or more image can be one or more still image and/or video, which can then be displayed to the user U using the display screen 24a. In an embodiment, the image capturing device 26 can display images and/or video of the user U on the display screen 24a in real time.

At step 306, the user U can use a voice command to instruct the mirror unit 12 to share the one or more image, for example, "share photo." At step 308, the system 10 can then cause various sharing or saving options (e.g., social media, messaging, etc.) to be displayed. The user U can then select a sharing option at step 310 such that the system 10 implements the user's selected sharing option.

Once the user U has shared the image, the user's U "friends" can comment on the user's U clothing choices (e.g., approve/disapprove and/or rate). The system 10 can thereafter adjust the outfit data to reflect the positive or negative reaction received on social media. For example, if one or more item of clothing receives a positive rating, the system 10 can automatically increase the weights applied to that one or more item. Conversely, negative reactions can cause the weights to be decreased. In an embodiment, the user U can choose which friends' comments will affect the user's U clothing data and/or scores.

Optionally, the user U can also receive comments regarding makeup and/or hairstyle. For example, the user U can receive comments regarding the type or color of makeup and/or hairstyle choices. The system can thereafter adjust makeup and/or hairstyle data to reflect the positive or negative reaction received on social media. For example, if one or more makeup choice receives a negative rating for not being compatable with a certain item of clothing, then the system 10 can automatically decrease the weights applied to that makeup choice when recommending similar styles of clothing, or can cease to recommend such a combination altogether.

In an embodiment, the friends which rate the user's U clothing can be the same friends that the user U is scheduled to meet according to meetings documented in the user's U digital calendar. Thus, the friends' reactions to outfits can affect how future recommendations are made by the system 10 when the user U has a scheduled meeting with a particular friend that day. For example, if the friend has a negative reaction to a style of clothing on a previous occasions, then the system 10 can reduce the weight of that style or a similar style when making a recommendation for a meeting with that friend. Conversely, if the friend has a positive reaction to a style of clothing on a previous occasions, then the system 10 can increase the weight of that style or a similar style when making a recommendation for a meeting with that friend. In this way, the user's U clothing can be tailored to a particular person which the user U will meet on any given day.

The embodiments described herein provide improved systems and methods for generating clothing recommendations, for example, using a mirror unit 12 as described herein. By condensing the data and calculating scores as described herein, the systems and methods save time and effort in picking an appropriate outfit on a daily basis. Further, by utilizing user feedback based on accepted/rejected outfits, the system 10 can optimize itself for a user's preferences over time. Further still, by using expert models as described herein, a user U is able to imitate the styles of his or her favorite designers, stylists, influencers, etc. It should be understood that various changes and modifications to the system an method described herein will be apparent to those skilled in the art and can be made without diminishing the intended advantages.

General Interpretation of Terms

In understanding the scope of the present invention, the term "comprising" and its derivatives, as used herein, are intended to be open-ended terms that specify the presence of the stated features, elements, components, groups, and/or steps, but do not exclude the presence of other unstated features, elements, components, groups, integers and/or steps. The foregoing also applies to words having similar meanings such as the terms, "including", "having" and their derivatives. Also, the terms "part." "section," or "element" when used in the singular can have the dual meaning of a single part or a plurality of parts.

The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only and not for the purpose of limiting the invention as defined by the appended claims and their equivalents.

What is claimed is:

1. A system for generating one or more clothing recommendation for a user, the system comprising:
    a mirror including a first side and a second side, the first side including a reflective surface;
    a display device configured to display a clothing recommendation to the user while the user views the first side of the mirror;
    a memory configured to store a wardrobe database including clothing data related to a plurality of items of clothing owned by the user; and
    a processor programmed to: (i) access a database including a plurality of expert models, the plurality of expert models including algorithms that are weighted based on surveys taken by experts regarding fashion preferences; (ii) select of one of the plurality of expert models based on a preference of the user; (iii) generate the clothing recommendation using the clothing database in combination with the selected expert model, the clothing recommendation including at least one suggested item of clothing of the plurality of items of clothing; and (iv) cause the display device to display the clothing recommendation to the user while the user views the first side of the mirror.

2. The system of claim 1, wherein
the selected expert model disqualifies at least one item of clothing stored in the wardrobe database.

3. The system of claim 1, wherein
the processor is further programmed to enable the user to modify one or more of the plurality of expert models.

4. The system of claim 1, wherein
at least one of the processor and the memory is located remotely from the display device.

5. A method of generating one or more clothing recommendation for a user, the method comprising:
    storing a wardrobe database for the user, the wardrobe database including clothing data related to a plurality of items of clothing owned by the user;
    accessing an expert database including a plurality of expert models, the plurality of expert models including algorithms that are weighted based on surveys taken by experts regarding fashion preferences;
    selecting of one of the plurality of expert models based on a preference of the user;
    generating a clothing recommendation using the clothing database in combination with the selected expert model, the clothing recommendation including at least one suggested item of clothing of the plurality of items of clothing; and
    presenting the clothing recommendation to the user.

6. The method of claim 5, comprising
applying weights from the selected expert model to the clothing data when generating the clothing recommendation.

7. The method of claim 5, comprising
disqualifying at least one item of clothing from the wardrobe database based on the selected expert model.

8. The method of claim 5, comprising
modifying one or more of the plurality of expert models based on preferences of the user.

9. The method of claim 5, wherein
the clothing recommendation includes a combination of a plurality of items of clothing from the wardrobe database.

10. The method of claim 5, comprising
receiving a selection of a first item of clothing that the user intends to wear, and
generating the clothing recommendation for at least one second item of clothing to be worn in combination with the first item of clothing.

11. A method of enabling a plurality of expert models for use in generating a clothing recommendation for a user, the method comprising:
    receiving a survey taken by an expert regarding a plurality of fashion preferences of the expert;
    creating an expert model including an algorithm with weighted values based on the survey responses regarding the fashion preferences of the expert; and
    adding the expert model to an expert database including the plurality of expert models so that the user can select the expert model for use in generating the clothing recommendation using a wardrobe database for the user in combination with the expert model, the wardrobe database including clothing data related to a plurality of items of clothing owned by the user.

12. The method of claim 11, comprising
generating the clothing recommendation by calculating a clothing score using the algorithm from the expert model.

13. The method of claim 11, comprising
generating the clothing recommendation based on fashionability of an item of clothing from the wardrobe database and at least one of how recently the user has worn the item of clothing and a user preference for the item of clothing,
the fashionability of the item of clothing determined using the algorithm from the expert model.

14. The method of claim 11, comprising
disqualifying at least one item of clothing from the wardrobe database based on the selected expert model.

15. The method of claim 11, wherein
creating the expert model includes applying a higher weight to the algorithm based on a survey response indicating clothing is fashionable or applying a lower weight to the algorithm based on a survey response indicating that clothing is unfashionable.

16. The system of claim 1, wherein
each survey includes a number of questions that determine fashion preferences of a respective expert.

17. The system of claim 1, wherein
each survey includes one or more questions regarding colors or patterns preferred by a respective expert.

18. The system of claim 1, wherein
the processor is further programmed to apply situational data when generating the clothing recommendation, the situational data including at least one of weather data or calendar data.

19. The method of claim 5, wherein
each survey includes a number of questions that determine fashion preferences of a respective expert.

20. The method of claim 5, wherein
generating the clothing recommendation includes applying situational data including at least one of weather data or calendar data.

* * * * *